(No Model.) 2 Sheets—Sheet 1.

W. H. LIGHTCAP.
BAND CUTTER AND FEEDER FOR THRASHING MACHINES.

No. 330,718. Patented Nov. 17, 1885.

WITNESSES
N. A. Clark.
Jno. C. Schroeder

INVENTOR
William H. Lightcap.
by Geo W Dyer
Atty (No Model.) 2 Sheets—Sheet 2.

W. H. LIGHTCAP.
BAND CUTTER AND FEEDER FOR THRASHING MACHINES.

No. 330,718. Patented Nov. 17, 1885.

WITNESSES:
Norris A. Clark.
Jno. C. Schroeder.

William H. Lightcap
INVENTOR
by Geo. W. Dyer
Atty.

UNITED STATES PATENT OFFICE.

WILLIAM H. LIGHTCAP, OF HAZEL GREEN, WISCONSIN.

BAND-CUTTER AND FEEDER FOR THRASHING-MACHINES.

SPECIFICATION forming part of Letters Patent No. 330,718, dated November 17, 1885.

Application filed June 25, 1884. Serial No. 135,944. (No model.)

*To all whom it may concern:*

Be it known that I, WILLIAM H. LIGHTCAP, of Hazel Green, in the county of Grant and State of Wisconsin, have invented a new and useful Improvement in Band-Cutters and Feeders for Thrashing-Machines; and I do hereby declare that the following is a full and exact description of the same, reference being had to the accompanying drawings, and to the letters of reference marked thereon.

The object of this invention is to increase the efficiency of band-cutting and feeding attachments for thrashing-machines; and the novelty consists in the construction, arrangement, and combination of the component parts, all as more fully hereinafter set forth and claimed.

Figure 1:
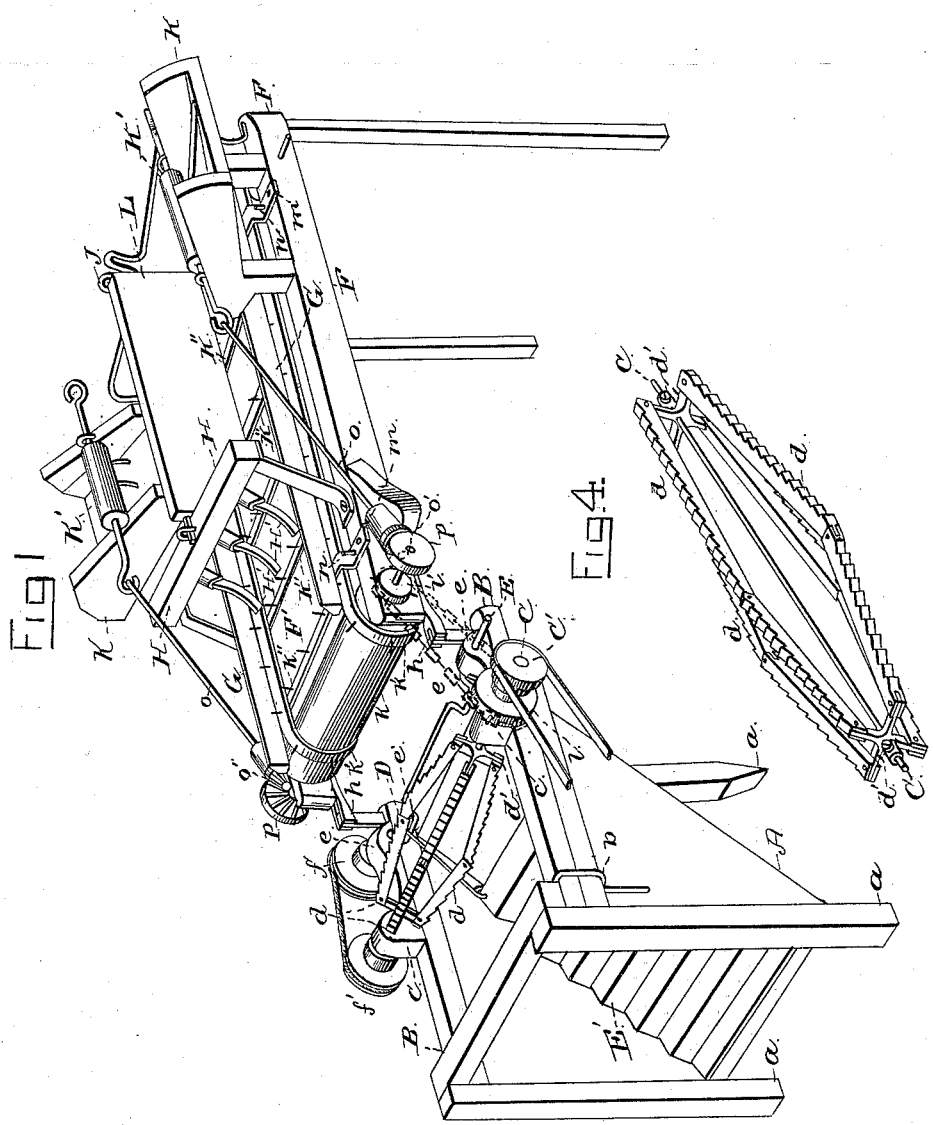
Figure 2:
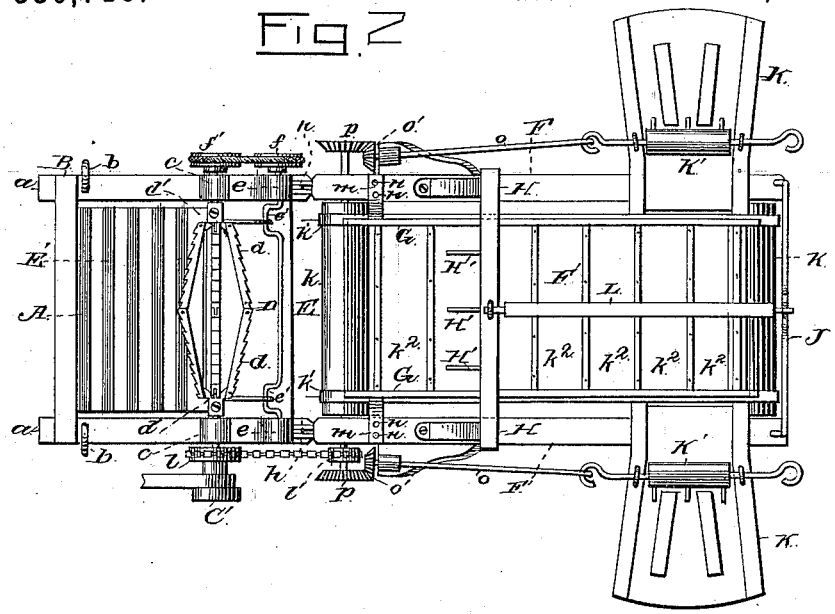
Figure 3:
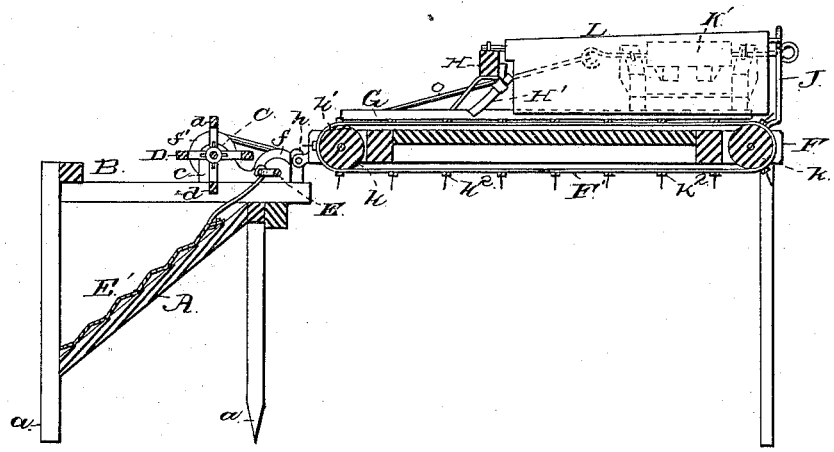

For the better understanding of this invention reference is made to the accompanying drawings, in which Figure 1 is a perspective view of the entire machine; Fig. 2, a plan view of the top; Fig. 3, a longitudinal sectional elevation; and Fig. 4, a view in detail of the spreading or distributing reel.

In the drawings, A denotes the chute of the thrashing-cylinder, having an inclined bottom and supported by legs *a a a*.

B is the feeder frame or support, which is secured to the top of the chute by means of clamps *b b*, to render these two parts separable, for there are conditions of grain whereby it is absolutely necessary that the feeder be detached and the grain fed into the cylinder by hand. In boxes *c c*, on the frame B, is journaled a shaft, C, carrying an expansible spreading or distributing reel, D, which consists of four or more arms, *d*, loosely jointed at their centers and supported at each end by spiders *d'*, adjustably secured to said shaft in order that there may be as much rise given to the center of the reel as is necessary for different kinds of grain and different conditions of grain. For instance, if the grain is very dry, the arms of the spreading or distributing reel are adjusted parallel, or nearly so, with one another; but if the grain be damp and needs more shaking, then these arms are adjusted accordingly to give a greater pitch. Each of these arms *d* is serrated or provided with teeth upon one side for the purpose of more evenly distributing the grain as it passes the spreading or distributing-reel. Upon one end of the shaft C is mounted a changeable speed-gearing consisting of a cone-pulley, C', around which is passed a belt from the wheel which drives the cylinder of the thrashing-machine. By this connection the spreading or distributing reel can be rotated at different rates of speed, accordingly as the grain is dry or damp, and at the same time not affect the speed of the thrashing-cylinder. In the rear of the boxes *c c*, supporting the shaft C, are other similar boxes, *e e*, in which is journaled a shaft, E, having two double cranks, *e' e'*, which have link-connection with a fluted metallic apron, E', the sliding action of which keeps the chute clear of all returning grain. The apron is operated by a pulley, *f*, mounted on one end of the shaft E, and connecting by belt with a pulley, *f'*, on one end of the spreading or distributing reel.

The frame supporting the bundle-carrier and band-cutter is attached to the feeder frame or support by hinged staples *h h*, which are secured at one end to the former, and at their opposite ends are inserted in holes made in the end of the feeder-frame. This means of attachment allows the carrier to be quickly detached or raised and lowered, in accordance with the height of the stack. This bundle-carrier consists of a table or platform, F, supported at its outer ends by proper means, and provided at each end with a roll, *k*, around which passes an endless apron or raker, F', which conveys the sheaves of grain to the spreading or distributing reel. This conveyer is preferably a rake, (as such would prevent the sheaves from sticking in passing under the band-cutter,) and is composed of belts or chains *k'*, provided at proper intervals of space with transverse strips or bars *k''*.

Revolution is imparted to the rolls and the endless apron or rake by a sprocket-chain passing around sprocket-wheels *l l'*, mounted on the feeder or distributer shaft and the inner end roll, respectively.

G G denote two guide-strips arranged lengthwise and on each side of the carrier-frame. These strips are adapted to adjustment toward or away from each other by means of supporting angle-irons *m m*, provided with a series of perforations, any one of which is capable of receiving the pins n n, secured on the outer top edges of the carrier. When the machine is run by horse-power, it is customary to feed but one sheaf at a time, and these adjustable guide-strips enable the sheaf to be conveyed along the center of the carrier; but when steam is the motive power more than one sheaf is fed at the same time, and then these guide-strips are held at or near the side of the endless apron or rake. A cross-beam, H, is properly supported upon the carrier from above the endless apron, near its discharge end, and carries a series of curved sickle-edge knives, H', which sever the bands of the sheaves or bundles as they pass beneath the said beam. These knives may be attached to their beam, so as to have a certain amount of spring in their bearings, or they may be made rigid.

When two sheaves are fed at the same time, I employ a swinging board, h, which separates the bundles, and also compels them to feed straight with the endless apron. This board is arranged centrally above the endless apron lengthwise of the carrier, and is supported at one upper corner by the cross-beam H, which carries the knives, and at the opposite upper corner by a wire frame, J, secured on the outer end of the carrier-frame.

To each side of the carrier-frame, at opposite points near its outer end, is secured an inclined chute, K, into which the sheaves or bundles of grain are thrown from the stack. These chutes are each provided with a rake, K', which is rotated by connection with a shaft, o, having an end pinion, o', meshing with a bevel-pinion, p, mounted on the outer end of the shaft carrying the inner end roller of the carrier-frame. By this gearing the speed of the spreading or distributing reel governs the speed of the rakes within the receiving-chutes of the carrier.

The sheaves or bundles are thrown from the stack into the chutes of the carrier, and by the rakes are carried one by one over onto the endless apron, by which they are carried forward under the knives, which cut the bands, and thus cause the bundles to separate, and it falls upon the spreading or distributing reel by which it is spread out and thoroughly shaken, and then dumped into the chute of the thrashing-cylinder.

What I claim, and desire to secure by Letters Patent, is—

1. In a feeder for thrashing-machines, the combination of the feeding-chute, a spreading or distributing reel, its frame or support, and clasps whereby the latter is removably attached upon said chute or feeding end of the machine, substantially as described.

2. In a band-cutter and feeder for thrashing-machines, the combination, with the feeding-chute, of the bundle-carrier and band-cutter, their supporting-frame, and the hinged staples, whereby the latter is removably attached to said chute and may be raised or lowered, substantially as and for the purposes set forth.

3. In a feeder for thrashing-machines, the combination of a feeding-conduit, an expansible spreading or distributing reel, and changeable speed-gearing consisting of a cone-pulley and the driving-belt, substantially as described.

4. In a feeder for thrashing-machines, an expansible spreading or distributing reel comprising a shaft, a pair of spiders adjustably mounted thereon, and several toothed arms, each made in two sections pivotally connected together and supported at their ends by said spiders, substantially as described.

5. In a feeder for thrashing-machines, the combination of the feeding-chute, a spreading or distributing reel and its shaft, a fluted metallic apron arranged within the chute, a double crank-shaft to which said apron is attached, and intermediate gearing connecting said crank-shaft with the shaft of the spreading or distributing reel, substantially as and for the purposes set forth.

6. In a band-cutter and feeder for thrashing-machines, the combination of the supporting frame-work, the feeding-chute, an endless apron or rake arranged upon a pair of rolls, and expansible spreading or distributing reel mounted over the feeding-chute, and intermediate gearing connecting the shaft of said reel with the shaft of the inner roll of the endless apron, substantially as described.

7. In a band-cutter and feeder for thrashing-machines, the combination of the supporting frame-work, an endless apron or rake, two adjustable guide-strips, the band-cutting knives, a receiving-chute attached to the carrier-frame, a rotative rake therein, and intermediate gearing connecting the same with the shaft of the inner roll of the endless apron, substantially as described.

In testimony whereof I affix my signature in presence of two witnesses.

WILLIAM H. LIGHTCAP.

Witnesses:
WILLIAM GRAHAM,
MONROE M. CADY.